(12) United States Patent
Kuze et al.

(10) Patent No.: US 10,122,014 B2
(45) Date of Patent: Nov. 6, 2018

(54) MIXED METAL OXIDE AND SODIUM SECONDARY BATTERY

(75) Inventors: Satoru Kuze, Tsukuba (JP); Masami Makidera, Tsukuba (JP); Taketsugu Yamamoto, Tsukuba (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 593 days.

(21) Appl. No.: 12/865,976

(22) PCT Filed: Feb. 3, 2009

(86) PCT No.: PCT/JP2009/051787
§ 371 (c)(1),
(2), (4) Date: Aug. 3, 2010

(87) PCT Pub. No.: WO2009/099062
PCT Pub. Date: Aug. 13, 2009

(65) Prior Publication Data
US 2010/0323232 A1    Dec. 23, 2010

(30) Foreign Application Priority Data

Feb. 4, 2008    (JP) ................................ 2008-023673
Feb. 6, 2008    (JP) ................................ 2008-026154

(51) Int. Cl.
*H01M 4/00*    (2006.01)
*H01M 4/525*    (2010.01)
(Continued)

(52) U.S. Cl.
CPC ......... *H01M 4/525* (2013.01); *H01M 2/1653* (2013.01); *H01M 2/1686* (2013.01);
(Continued)

(58) Field of Classification Search
CPC ..... H01M 4/525; H01M 4/505; H01M 10/054
(Continued)

(56) References Cited

U.S. PATENT DOCUMENTS 5,558,961 A    9/1996    Doeff et al.
6,447,958 B1 *    9/2002    Shinohara et al. ........... 429/248
(Continued)

FOREIGN PATENT DOCUMENTS

CN    1595680 A    3/2005
CN    1719639 A    1/2006
(Continued)

OTHER PUBLICATIONS

U.S. Appl. No. 12/865,993, Satoru Kuze, et al., filed Aug. 3, 2010.
(Continued)

*Primary Examiner* — Nicholas P D'Aniello
(74) *Attorney, Agent, or Firm* — Sughrue Mion, PLLC

(57) ABSTRACT

The present invention provides a sodium secondary battery capable of reducing the amount of lithium used, and ensuring a larger discharge capacity maintenance rate when having repeated a charge and discharge, as compared with conventional techniques; and a mixed metal oxide usable as the positive electrode active material therefor. A mixed metal oxide of the present invention comprises Na and $M^1$ wherein $M^1$ represents three or more elements selected from the group consisting of Mn, Fe, Co and Ni with an Na:$M^1$ molar ratio being a:1 wherein a is a value falling within the range of more than 0.5 and less than 1. Also, a mixed metal oxide of the present invention is represented by the following formula (1):

$$Na_aM^1O_2 \qquad (1)$$

wherein $M^1$ and a each have the same meaning as above.
(Continued)

The positive electrode active material for secondary batteries of the present invention comprises the mixed metal oxide above.

6 Claims, 8 Drawing Sheets

(51) Int. Cl.
*H01M 10/054* (2010.01)
*H01M 2/16* (2006.01)
*H01M 4/505* (2010.01)
*H01M 10/54* (2006.01)

(52) U.S. Cl.
CPC ......... *H01M 4/505* (2013.01); *H01M 10/054* (2013.01); *H01M 10/54* (2013.01); *Y02W 30/84* (2015.05)

(58) Field of Classification Search
USPC .................................... 429/221, 223, 224
See application file for complete search history.

(56) References Cited

U.S. PATENT DOCUMENTS

| | | | |
|---|---|---|---|
| 7,303,840 | B2 | 12/2007 | Thackeray et al. |
| 7,635,536 | B2 | 12/2009 | Johnson et al. |
| 7,846,585 | B2 | 12/2010 | Thackeray et al. |
| 8,298,701 | B2 | 10/2012 | Whitacre et al. |
| 2002/0034689 | A1 | 3/2002 | Hoshida et al. |
| 2002/0192552 | A1 | 12/2002 | Lampe-Onnerud et al. |
| 2002/0192553 | A1 | 12/2002 | Barker et al. |
| 2003/0003361 | A1 | 1/2003 | Sunagawa et al. |
| 2003/0082452 | A1* | 5/2003 | Ueda et al. ............... 429/231.1 |
| 2006/0051671 | A1 | 3/2006 | Thackeray et al. |
| 2007/0212605 | A1 | 9/2007 | Yamaki et al. |
| 2007/0218361 | A1* | 9/2007 | Inoue et al. ............... 429/231.1 |
| 2007/0292758 | A1 | 12/2007 | Uchida et al. |
| 2008/0102369 | A1 | 5/2008 | Sakata et al. |
| 2009/0050841 | A1 | 2/2009 | Sasaki et al. |
| 2009/0053613 | A1 | 2/2009 | Inoue et al. |
| 2009/0103241 | A1 | 4/2009 | Kikuchi et al. |
| 2009/0148762 | A1 | 6/2009 | Kasamatsu et al. |
| 2009/0159838 | A1 | 6/2009 | Okada et al. |
| 2010/0009254 | A1 | 1/2010 | Itaya et al. |
| 2010/0055554 | A1 | 3/2010 | Makidera et al. |
| 2010/0104944 | A1 | 4/2010 | Saito et al. |
| 2010/0203389 | A1 | 8/2010 | Yoshida |
| 2010/0209776 | A1 | 8/2010 | Kim |
| 2011/0305937 | A1 | 12/2011 | Kim et al. |

FOREIGN PATENT DOCUMENTS

| | | |
|---|---|---|
| CN | 1950962 A | 4/2007 |
| EP | 1 070 359 A1 | 1/2001 |
| JP | 64-25117 A | 1/1989 |
| JP | 01-260767 A | 10/1989 |
| JP | 03-291863 A | 12/1991 |
| JP | 10-81521 A | 3/1998 |
| JP | 1081520 A | 3/1998 |
| JP | 1081521 A | 3/1998 |
| JP | 10-324758 A | 12/1998 |
| JP | 11-40156 A | 2/1999 |
| JP | 11317226 | 11/1999 |
| JP | 2000-030686 A | 1/2000 |
| JP | 2000-243394 A | 9/2000 |
| JP | 2001-332262 A | 11/2001 |
| JP | 2002-025555 A | 1/2002 |
| JP | 2002-069221 A | 3/2002 |
| JP | 2002069221 A | 3/2002 |
| JP | 2003-272629 A | 9/2003 |
| JP | 2004-79697 A | 3/2004 |
| JP | 2004-362934 A | 12/2004 |
| JP | 2006-151795 A | 6/2006 |
| JP | 2006-179473 A | 7/2006 |
| JP | 2006179473 A * | 7/2006 |
| JP | 2006-216508 A | 8/2006 |
| JP | 2006-216509 A | 8/2006 |
| JP | 2006-302542 A | 11/2006 |
| JP | 2007-035588 A | 2/2007 |
| JP | 2007-039313 A | 2/2007 |
| JP | 2007-053081 A | 3/2007 |
| JP | 2007-073424 A | 3/2007 |
| JP | 2007053081 A * | 3/2007 |
| JP | 2007-112674 A | 5/2007 |
| JP | 2007-188703 A | 7/2007 |
| JP | 2007-234512 A | 9/2007 |
| JP | 2007-287661 A | 11/2007 |
| JP | 2007-299612 A | 11/2007 |
| JP | 2008-186753 A | 8/2008 |
| WO | 99/53556 A1 | 10/1999 |
| WO | 2006/082719 A1 | 8/2006 |
| WO | 2008/062895 A1 | 5/2008 |
| WO | 2008081839 A1 | 7/2008 |

OTHER PUBLICATIONS

U.S. Appl. No. 12/865,987, Satoru Kuze et al., filed Aug. 3, 2010.
Japanese Office Action issued by the Japanese Patent Office in counterpart Japanese Patent Application No. 2009-022368 dated Oct. 2, 2012.
Z. Lu et al., "T2 and O2 $Li_{2/3}$ $[Co_x Ni_{1/3-x/2} Mn_{2/3-x/2}]$ $O_2$ Electrode Materials," Journal of the Electrochemical Society, 2002, vol. 149, No. 8, p. A1083-A1091.
Z. Lu et al., "Superlattice Ordering of Mn, Ni, and Co in Layered Alkali Transition Metal Oxides with P2, P3, and O3 Structures," Chemistry of Materials, American Chemical Society, 2000, vol. 12, No. 12, p. 3583-3590.
Japanese Office Action issued in counterpart JP Application No. 2009-022367, dated Jul. 2, 2013.
Zhonghua Lu, et al., "Superlattice Ordering of Mn, Ni, and Co in Layered Alkali Transition Metal Oxides with P2, P3 and O3 Structures", Chem. Mater., vol., 12, pp. 3583-3590 (2000).
English Translation of counterpart JP Application No. 2008-023673, dated Apr. 2, 2013.
Office Action dated Mar. 25, 2015 in corresponding Korean Patent Application No. 10-2010-7017299 with English Translation.
Office Action dated Mar. 25, 2015 in corresponding Korean Patent Application No. 10-2010-7017298 with English Translation.
Office Action dated Mar. 26, 2015 in corresponding Korean Patent Application No. 10-2010-7017300 with English Translation.
Communication dated Sep. 11, 2015 from the Korean Intellectual Property Office in counterpart application No. 10-2010-7017298.
Office Action dated Sep. 11, 2015, issued by the Korean Intellectual Property Office in counterpart Korean Patent Application No. 10-2010-7017299.
Communication dated Mar. 24, 2016, issued by the Korean Intellectual Property Office in corresponding Korean application No. 10-2010-7017299.
M.-H. Lee et al., Synthetic optimization of Li [Ni1/3Co1/3Mn1/3] O2 via co-precipitation, Electrochimica Acta, vol. 50, pp. 939-948.
S.-H. Park et al., Physical and electrochemical properties of spherical Li1+x(Ni1/3Co1/3Mn1/3)1-xO2 cathode materials, Jounral of Power Sources, vol. 177, pp. 177-183.
Restriction Requirement issued in U.S. Appl. No. 12/866,148, dated Sep. 24, 2012.
Office Action issued in U.S. Appl. No. 12/866,148, dated Nov. 8, 2012.
Office Action issued in U.S. Appl. No. 12/866,148, dated Jun. 18, 2013.
Office Action issued in U.S. Appl. No. 12/865,993, dated Aug. 17, 2012.
Office Action issued in U.S. Appl. No. 12/865,993, dated Feb. 15, 2013.
Third Office Action dated Sep. 2, 2013 in Chinese Patent Application No. 200980103861.X with translation.
Third Office Action dated Oct. 12, 2013 in Chinese Patent Application No. 200980104110.X with translation.

(56) References Cited

OTHER PUBLICATIONS

Second Office Action dated Jan. 7, 2013 in Chinese Patent Application No. 200980103861.X with translation.
Second Office Action dated Apr. 18, 2013 in Chinese Patent Application No. 200980104110.X with translation.
First Office Action dated Oct. 8, 2012 in Chinese Patent Application No. 200980104110.X with translation.
First Office Action dated Aug. 3, 2012 in Chinese Patent Application No. 200980103861.X with translation.
Office Action dated Nov. 27, 2015 in Korean Patent Application No. 10-2010-7017300 with translation.
Communication dated Oct. 26, 2017 from the Indian Patent Office in counterpart application No. 4859/CHENP/2010.
Communication dated Oct. 30, 2017 from the Indian Patent Office in counterpart application No. 4873/CHENP/2010.
Stevens et al., "High Capacity Anode Materials for Rechargeable Sodium-Ion Batteries," Journal of the Electrochemical Society, vol. 147, No. 4, 2000, pp. 1271-1273.
Lu et al., "In Situ X-Ray Diffraction Study for P2-$Na_{2/3}[Ni_{1/3}Mn_{2/3}]O_2$," Journal of the Electrochemical Society, vol. 148, No. 11, 2001, pp. A1225-A1229.

\* cited by examiner

MIXED METAL OXIDE AND SODIUM SECONDARY BATTERY

TECHNICAL FIELD

The present invention relates to a mixed metal oxide and a sodium secondary battery.

BACKGROUND ART

A mixed metal oxide is being used as a positive electrode active material of a secondary battery. Among secondary batteries, a lithium secondary battery has already been put into commercial use as a small power source for cellular phones, notebook computers and the like. Furthermore, because of its applicability as a large power source, for example, as a power source for vehicles such as electric vehicle and hybrid electric vehicle, or as a power source for distributed power storages, the demand thereof is on the rise. However, in a lithium secondary battery, a large amount of scarce metal elements such as lithium are contained in the raw material of the positive electrode active material, and there is concern about supply of the raw material to meet the growing demand for a large power source.

In response, a sodium secondary battery is being studied as a secondary battery capable of eliminating the concern about supply. The sodium secondary battery can be fabricated using a material which has a plentiful supply and which is inexpensive, and its commercial application is expected to allow for a large supply of large power sources.

In Patent Document 1, a positive electrode active material obtained by calcining a raw material comprising Na, Mn and Co in a compositional ratio (Na:Mn:Co) of 0.7:0.5:0.5 is specifically described as the positive electrode active material for sodium secondary batteries.

Patent Document 1: Japanese Unexamined Patent Publication No. 2007-287661 (Example 1)

DISCLOSURE OF THE INVENTION

Problem to be Solved by the Invention

The amount of lithium used can be reduced by using the above-described positive electrode active material, but in a sodium secondary battery using this positive electrode active material, the discharge capacity maintenance rate when having repeated a charge and discharge is not sufficient. An object of the present invention is to provide a sodium secondary battery capable of reducing the amount of lithium used, and ensuring a larger discharge capacity maintenance rate when having repeated a charge and discharge as compared with conventional techniques; and a mixed metal oxide usable as the positive electrode active material therefor.

Means to Solve the Problem

The present inventors have continued intensive studies to attain the above-described object, and accomplished the present invention. That is, the present invention provides the following inventions.

<1> A mixed metal oxide comprising Na and $M^1$ (wherein $M^1$ represents three or more elements selected from the group consisting of Mn, Fe, Co and Ni, with an Na:$M^1$ molar ratio being a:1 wherein a is a value falling within the range of more than 0.5 and less than 1.

<2> A mixed metal oxide represented by the following formula (1):

$$Na_aM^1O_2 \quad (1)$$

wherein $M^1$ and a each have the same meaning as above.

<3> The mixed metal oxide as described in <1> or <2> above, wherein $M^1$ comprises at least Mn.

<4> The mixed metal oxide as described in <3> above, wherein an $M^1$:Mn molar ratio is 1:b wherein $M^1$ has the same meaning as above, and b is a value of not less than 0.2 and less than 1.

<5> The mixed metal oxide as described in any one of <1> to <4> above, wherein $M^1$ represents Mn, Fe and Ni.

<6> The mixed metal oxide as described in any one of <1> to <5> above, wherein a is a value falling within the range of from 0.6 to 0.9.

<7> A positive electrode active material for sodium secondary batteries which comprises the mixed metal oxide described in any one of <1> to <6> above.

<8> A positive electrode for sodium secondary batteries which comprises the positive electrode active material described in <7> above.

<9> A sodium secondary battery having the positive electrode described in <8> above.

<10> The sodium secondary battery as described in <9> above further having a separator.

<11> The sodium secondary battery as described in <10> above, wherein the separator is a separator having a porous laminated film in which a heat-resistant porous layer comprising a heat-resistant resin and a porous film comprising a thermoplastic resin are stacked each other.

EFFECT OF THE INVENTION

According to the present invention, a sodium secondary battery capable of reducing the amount of lithium used, and ensuring a larger discharge capacity maintenance rate when having repeated a charge and discharge as compared with conventional techniques; and a mixed metal oxide usable as the positive electrode active material therefor can be provided. Therefore, the present invention is very useful in industry.

BEST MODE FOR CARRYING OUT THE INVENTION

Figure 1:
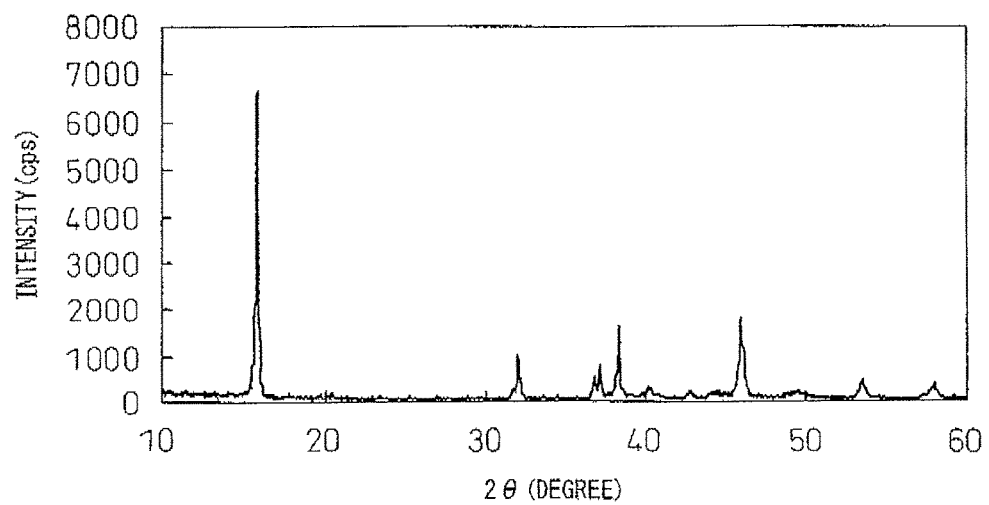
FIG. 1 A powder X-ray diffraction pattern of Mixed Metal Oxide C1.

<Mixed Metal Oxide of the Present Invention>

The mixed metal oxide of the present invention is characterized by comprising Na and $M^1$ wherein $M^1$ represents three or more elements selected from the group consisting of Mn, Fe, Co and Ni, with a Na:$M^1$ molar ratio being a:1 wherein a is a value falling within the range of more than 0.5 and less than 1.

Also, the mixed metal oxide of the present invention is a mixed metal oxide represented by the following formula (1):

$$Na_aM^1O_2 \qquad (1)$$

wherein $M^1$ and a each have the same meaning as above.

In one embodiment, in the mixed metal oxide of the present invention, $M^1$ comprises at least Mn. At this time, the $M^1$:Mn molar ratio is preferably 1:b wherein $M^1$ has the same meaning as above, and b is a value of not less than 0.2 and less than 1. Preferably, $M^1$ comprises at least Mn and Ni, from the standpoint of more elevating the average discharge voltage of the obtained sodium secondary battery and increasing the energy density of the battery. More preferably, $M^1$ represents Mn, Fe and Ni, that is, comprises no Co which is a scarce metal element, and even in this case, superior effects of the present invention can be obtained. In the case where $M^1$ represents Mn, Fe and Ni, the compositional ratio (by mol) of Mn:Fe:Ni is preferably 1:(0.3 to 3):(0.01 to 2), more preferably 1:(0.5 to 2):(0.1 to 1.2).

Also, in order to more enhance the effects of the present invention, a is preferably a value falling within the range of from 0.6 to 0.9, more preferably a value falling within the range of from 0.7 to 0.9, still more preferably about 0.8, that is, a value falling within the range of from 0.75 to 0.84.

In the mixed metal oxide of the present invention, a part of $M^1$ may be substituted with a metal element other than $M^1$. By this substitution, the battery characteristics of a sodium secondary battery are enhanced in some cases.

<Production Method of Mixed Metal Oxide of the Present Invention>

The mixed metal oxide of the present invention can be produced by calcining a metal-containing compound mixture which has a composition capable of giving the mixed metal oxide of the present invention after calcination. More specifically, metal-containing compounds comprising corresponding metal elements are weighed to obtain a predetermined composition and mixed, and the obtained mixture is calcined, whereby the mixed metal oxide can be produced. For example, a mixed metal oxide having a metal element ratio represented by Na:Mn:Fe:Ni=0.7:0.333:0.333:0.333 that is one of preferred metal element ratios can be produced by weighing respective raw materials of $Na_2CO_3$, $MnO_2$ and $Fe_3O_4$ to give an Na:Mn:Fe:Ni molar ratio of 0.7:0.333:0.333:0.333, mixing these raw materials, and calcining the obtained mixture.

As the metal-containing compound usable to produce the mixed metal oxide of the present invention, an oxide, or a compound capable of becoming an oxide when decomposed and/or oxidized at a high temperature, such as hydroxide, carbonate, nitrate, halide and oxalate, can be used. The sodium compound is preferably $Na_2CO_3$, $NaHCO_3$ or $Na_2O_2$, and, in view of handleability, more preferably $Na_2CO_3$. The manganese compound is preferably $MnO_2$, the iron compound is preferably $Fe_3O_4$, the nickel compound is preferably NiO, and the cobalt compound is preferably $Co_3O_4$. These metal-containing compounds may be a hydrate.

In order to mix metal-containing compounds, an apparatus usually used in industry, such as ball mill, V-type mixer and stirrer, can be used. The mixing here may be either dry mixing or wet mixing. A mixture of metal-containing compounds, which has a predetermined composition, may be obtained also by a precipitation method.

The mixture of the above-described metal-containing compounds is calcined, for example, by keeping it at a temperature in the range of from 600° C. to 1,600° C. over 0.5 hours to 100 hours, whereby the mixed metal oxide of the present invention is obtained. For example, the calcination temperature range is preferably from 600° C. to 900° C., more preferably from 650° C. to 850° C. In the case where a compound capable of being decomposed and/or oxidized at a high temperature, such as hydroxide, carbonate, nitrate, halide and oxalate, is used in the mixture of metal-containing compounds, the above-described calcination may also be carried out after preliminarily calcining the mixture by keeping it at a temperature in the range of from 400° C. to 1,600° C. to convert the compound into an oxide or to remove crystal water from the compound. The atmosphere in which the preliminary calcination is carried out may be an inert gas atmosphere, an oxidizing atmosphere, or a reducing atmosphere. After the preliminary calcination, pulverization may also be carried out.

The atmosphere of the calcination may be any of an inert atmosphere, such as nitrogen atmosphere and argon atmosphere; an oxidizing atmosphere, such as air atmosphere, oxygen atmosphere, oxygen-containing nitrogen atmosphere and oxygen-containing argon atmosphere; and a reducing atmosphere, such as hydrogen-containing nitrogen atmosphere comprising from 0.1 vol % to 10 vol % of hydrogen, and hydrogen-containing argon atmosphere comprising from 0.1 vol % to 10 vol % of hydrogen. In order to calcine the mixture in a strongly reducing atmosphere, the calcination may be carried out after incorporating an appropriate amount of carbon into the mixture of metal-containing compounds. Preferably, the calcination is carried out in an oxidizing atmosphere, such as air atmosphere.

By using, as the metal-containing compound, a halide such as fluoride or chloride in an appropriate amount, the crystallinity of the mixed metal oxide produced, and the average particle diameter of particles constituting the mixed metal oxide can be controlled. In this case, the halide sometimes works as a reaction accelerator (flux). Examples of the flux include NaF, $MnF_3$, $FeF_2$, $NiF_2$, $CoF_2$, NaCl, $MnCl_2$, $FeCl_2$, $FeCl_3$, $NiCl_2$, $CoCl_2$, $Na_2CO_3$, $NaHCO_3$, $NH_4Cl$, $NH_4I$, $B_2O_3$ and $H_3BO_3$. These can be used as a raw material (metal-containing compound) of the mixture, or can be used to be added in an appropriate amount to the mixture. Also, such a flux may be a hydrate.

In the case of using the mixed metal oxide of the present invention as a positive electrode active material for sodium secondary batteries, it is sometimes preferred to adjust the particle size by optionally subjecting the mixed metal oxide obtained as above to, for example, pulverization by means of a ball mill, a jet mill or the like, washing and classification. Also, calcination may be carried out two or more times. The particle of the mixed metal oxide may be surface-treated, for example, by coating the surface of the mixed metal oxide with an inorganic substance containing Si, Al, Ti, Y or the like. The crystal structure of the mixed metal oxide of the present invention is preferably not a tunnel structure.

The mixed metal oxide of the present invention can be used as a positive electrode active material for sodium secondary batteries, as is or after being subjected to a surface treatment such as coating. The positive electrode active material comprises the mixed metal oxide of the present invention. When the mixed metal oxide of the present invention is used for a sodium secondary battery, the obtained secondary battery can have a larger discharge capacity maintenance rate when having repeated a charge and discharge, as compared with conventional techniques. Also, by the present invention, the internal resistance of the obtained sodium secondary battery can be made small, and the overvoltage during charging and discharging can be reduced. Due to reduction in the overvoltage during charging and discharging, the large current discharge property of the secondary battery can be enhanced. Also, the stability of the battery in the case of the overcharging the secondary battery can be enhanced.

<Positive Electrode for Sodium Secondary Batteries of the Present Invention and Production Method Thereof>

A positive electrode for sodium secondary batteries of the present invention comprises the positive electrode active material of the present invention. The positive electrode for sodium secondary batteries of the present invention can be produced by loading, on a positive electrode current collector, a positive electrode mixture comprising the positive electrode active material of the present invention, an electrically conductive material and a binder.

Examples of the electrically conductive material include a carbonaceous material, such as natural graphite, artificial graphite, coke, and carbon black. Examples of the binder include a thermoplastic resin, and specific examples thereof include a fluororesin, such as polyvinylidene fluoride (hereinafter referred to as "PVDF"), polytetrafluoroethylene, ethylene tetrafluoride-propylene hexafluoride-vinylidene fluoride-based copolymer, propylene hexafluoride-vinylidene fluoride-based copolymer, and ethylene tetrafluoride-perfluorovinyl ether-based copolymer; and a polyolefin resin, such as polyethylene and polypropylene. Examples of the positive electrode current collector include Al, Ni and stainless steel.

The method for loading a positive electrode mixture on, a positive electrode current collector includes a method of pressure-molding the mixture, and a method of forming the positive electrode mixture into a paste by using an organic solvent or the like, applying and drying the paste on a positive electrode current collector, and fixing the mixture by pressing or the like. In the case of forming a paste, a slurry comprising a positive electrode active material, an electrically conductive material, a binder and an organic solvent is prepared. Examples of the organic solvent include an amine-based, solvent, such as N,N-dimethylaminopropylamine and diethyltriamine; an ether-based solvent, such as ethylene oxide and tetrahydrofuran; a ketone-based solvent, such as methyl ethyl ketone; an ester-based solvent, such as methyl acetate; and an aprotic polar solvent, such as dimethylacetamide and N-methyl-2-pyrrolidone. Examples of the method for applying a positive electrode mixture on a positive electrode current collector include a slit die coating method, a screen coating method, a curtain coating method, a knife coating method, a gravure coating method, and an electrostatic spraying method.

<Sodium Secondary Battery of the Present Invention>

A sodium secondary battery of the present invention has the positive electrode for sodium secondary batteries of the present invention. The sodium secondary battery of the present invention can be produced, for example, by stacking the positive electrode for sodium secondary batteries of the present invention, a separator, and a negative electrode comprising a negative electrode current collector having loaded thereon a negative electrode mixture, in this order; winding the stack to yield an electrode group; housing the electrode group in a battery can; and then impregnating the electrode group with an electrolytic solution composed of an organic solvent comprising an electrolyte.

Examples of the shape of the electrode group include a shape that gives a cross section of a circular shape, an elliptical shape, an oval shape, a rectangular shape, a corner-rounded rectangular shape or the like, when the electrode group is cut in the direction perpendicular to the winding axis. Examples of the shape of the battery include a paper shape, a coin shape, a cylinder shape, and a square shape.

<Sodium Secondary Battery of the Present Invention/Negative Electrode>

A negative electrodes usable in the sodium secondary battery of the present invention include an electrode capable of storing and releasing sodium ions such as a member obtained by loading, on a negative electrode current collector, a negative electrode mixture comprising a negative electrode active material, sodium metal and a sodium alloy. The negative electrode active material includes a carbonaceous material capable of storing and releasing sodium ions, such as natural graphite, artificial graphite, coke, carbon black, pyrolytic carbons, carbon fiber and calcined organic polymer compound. The shape of the carbonaceous material may be any of a flake, such as that of natural graphite, a sphere, such as that of mesocarbon microbead, a fiber, such as that of graphitized carbon fiber, or an aggregate of fine powder. The carbonaceous material may also work as an electrically conductive material.

As for the negative electrode active material, a chalcogen compound, such as oxide and sulfide, capable of storing and releasing sodium ions at a lower potential than a positive electrode may also be used.

The negative electrode mixture may comprise a binder and an electrically conductive material, if necessary. Accordingly, the negative electrode of the sodium secondary battery of the present invention may be configured to comprise a mixture of a carbonaceous material and a binder. The binder includes a thermoplastic resin, and specific examples thereof include PVDF, thermoplastic polyimide, carboxymethyl cellulose, polyethylene and polypropylene.

Examples of the negative electrode current collector include Cu, Ni and stainless steel, and Cu is preferred because Cu is difficult to be an alloy with sodium, and is easily formed into a thin film. Examples of the method for loading a negative electrode mixture on a negative electrode current collector are the same as in the case of a positive electrode, and include a method of pressure-molding the mixture, and a method of forming the negative electrode mixture into a paste by using a solvent or the like, applying and drying the paste on a negative electrode current collector, and fixing the mixture by pressing or the like.

<Sodium Secondary Battery of the Present Invention/Separator>

As a separator usable in the sodium secondary battery of the present invention, a member having a form, such as porous film, nonwoven fabric and woven fabric, and made of a material of a polyolefin resin, such as polyethylene and polypropylene, a fluororesin or a nitrogen-containing aromatic polymer can be used. A single-layer or multilayer separator using two or more of these materials may also be used. Examples of the separator include separators described in Japanese Unexamined Patent Publication Nos. 2000-30686 and 10-324758 . A thickness of the separator is preferably smaller as long as the mechanical strength can be maintained, from the standpoint of increase in the volumetric energy density of a battery and decrease in internal resistance thereof. In general, a thickness of the separator is preferably about 5 to 200 µm, more preferably about 5 to 40 µm.

The separator preferably has a porous film comprising a thermoplastic resin. In a secondary battery, the separator is located between a positive electrode and a negative electrode. When an extraordinary current flows in the battery due to short-circuit between a positive electrode and a negative electrode, or the like, the separator preferably plays a role by which the current is blocked to prevent an overcurrent from flowing (to shutdown). The shutdown is achieved by shutting fine pores of the porous film of the separator when the temperature exceeds a usual use temperature. Even when the temperature in the battery rises to a certain high temperature after the shutdown, it is preferable that the separator maintain the shutdown state without being ruptured due to the temperature, in other words, have high heat resistance. This separator includes a porous film having a heat-resistant material such as a porous laminated film in which a heat-resistant porous layer and a porous film are stacked each other, preferably a porous laminated film in which a heat-resistant porous layer comprising a heat-resistant resin and a porous film comprising a thermoplastic resin are stacked each other. By using such a porous film having a heat-resistant material as a separator, the secondary battery of the present invention can be more successfully prevented from thermal film rupture. The heat-resistant porous layer can be stacked on both sides of the porous film.

<Sodium Secondary Battery of the Present Invention/Separator/Porous Laminate Film Separator>

The separator composed of a porous laminated film in which a heat-resistant porous layer and a porous film are stacked each other is described below. A thickness of the separator is usually from 5 µm to 40 µm, preferably 20 µm or less. Assuming that a thickness of the heat-resistant porous layer is A (µm) and a thickness of the porous film is B (µm), the value of A/B is preferably from 0.1 to 1. Considering the ion permeability, the permeability of the separator is, in terms of Gurley permeability, preferably from 50 to 300 seconds/100 ml, more preferably from 50 to 200 seconds/100 ml. A void content of the separator is usually from 30 to 80 vol %, and preferably from 40 to 70 vol %.

(Heat-Resistant Porous Layer)

In the porous laminated film, the heat-resistant porous layer preferably comprises a heat-resistant resin. In order to elevate the ion permeability, a thickness of the heat-resistant porous layer is preferably from 1 µm to 10 µm, more preferably from 1 µm to 5 µm, and particularly preferably from 1 µm to 4 µm to be a thinner heat-resistant porous layer. The heat-resistant porous layer has fine pores, and the size (diameter) of the pore is usually 3 µm or less, preferably 1 µm or less. The heat-resistant porous layer may comprise a filler described later. The heat-resistant porous layer may be formed from an inorganic powder.

The heat-resistant resin contained in the heat-resistant porous layer includes polyamide, polyimide, polyamideimide, polycarbonate, polyacetal, polysulfone, polyphenylene sulfide, polyether ketone, aromatic polyester, polyethersulfone and polyetherimide. From the standpoint of further enhancing the heat resistance, polyamide, polyimide, polyamideimide, polyethersulfone and polyetherimide are preferred; and polyamide, polyimide and polyamideimide are more preferred. The heat-resistant resin is more preferably a nitrogen-containing aromatic polymer, such as aromatic polyamide (para-oriented aromatic polyamide, meta-oriented aromatic polyamide), aromatic polyimide and aromatic polyamideimide, still more preferably an aromatic polyamide, and yet still more preferably a para-oriented aromatic polyamide (hereinafter, referred to as "para-aramide"). In addition, the heat-resistant resin also includes poly-4-methylpentene-1, and a cyclic olefin-based polymer. By using such a heat-resistant resin, the heat resistance can be enhanced, i.e. the thermal film rupture temperature can be raised.

The thermal film rupture temperature depends on the types of heat-resistant resin, and is selected and used on the basis of the situation and the purpose of the use thereof. The thermal film rupture temperature is usually 160° C. or more. The thermal film rupture temperature can be controlled to about 400° C. in the case of using the above-described nitrogen-containing aromatic polymer, to about 250° C. in the case of using poly-4-methylpentene-1, and to about 300° C. in the case of using a cyclic olefin-based polymer, as the heat-resistant resin, respectively. The thermal film rupture temperature can be controlled to, for example, 500° C. or more in the case of using a heat-resistant porous layer formed from an inorganic powder.

The para-aramide is obtained by condensation polymerization of a para-oriented aromatic diamine and a para-oriented aromatic dicarboxylic acid halide, and is substantially composed of a repeating unit where the amide bond is bonded at the pars-position or equivalently oriented position of the aromatic ring (for example, the oriented position extending coaxially or in parallel to the opposite direction, such as 4,4'-biphenylene, 1,5-naphthalene, and 2,6-naphthalene). The para-aramide includes a para-aramide having a para-oriented-type and quasi-para-oriented-type structures. Specific examples thereof include poly(paraphenyleneterephthalamide), poly(parabenzamide), poly(4,4'-benzanilideterephthalamide), poly(paraphenylene-4,4'-biphenylenedicarboxylic acid amide), poly(paraphenylene-2,6-naphthalenedicarboxylic acid amide), poly(2-chloroparaphenyleneterephthalamide), and paraphenyleneterephthalamide/2,6-dichloroparaphenyleneterephthalamide copolymer.

The aromatic polyimide is preferably a wholly aromatic polyimide produced by condensation polymerization of an aromatic diacid anhydride and an aromatic diamine. Specific examples of the diacid anhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyl)hexafluoropropane, and 3,3',4,4'-biphenyltetracarboxylic dianhydride. Examples of the diamine include oxydianiline, para-phenylenediamine, benzophenonediamine, 3,3'-methylenedianiline, 3,3'-diaminobenzophenone, 3,3'-diaminodiphenylsulfone, and 1,5'-naphthalenediamine. A polyimide soluble in a solvent may be suitably used. Examples of such a polyimide include a polyimide as a polycondensate of 3,3',4,4'-diphenylsulfonetetracarboxylic dianhydride with an aromatic diamine.

Examples of the aromatic polyamideimide include those obtained by condensation polymerization of an aromatic dicarboxylic acid and an aromatic diisocyanate, and those obtained by condensation polymerization of an aromatic diacid anhydride and an aromatic diisocyanate. Specific examples of the aromatic dicarboxylic acid include isophthalic acid and terephthalic acid. Specific examples of the aromatic diacid anhydride include trimellitic anhydride. Specific examples of the aromatic diisocyanate include 4,4'-diphenylmethane diisocyanate, 2,4-tolylene diisocyanate, 2,6-tolylene diisocyanate, ortho-tolylene diisocyanate and m-xylylene diisocyanate.

When the heat-resistant porous layer comprises a heat-resistant resin, the heat-resistant porous layer may comprise one or more types of fillers. The filler that may be contained in the heat-resistant porous layer may be any one selected from an organic powder, an inorganic powder and a mixture thereof. The average particle diameter of the particle constituting the filler is preferably from 0.01 μm to 1 μm. Examples of the shape of the filler include an approximately spherical shape, a plate shape, a columnar shape, an acicular particle, a whisker shape and a fibrous shape, and any particles of these shapes may be used. The filler is preferably an approximately spherical particle due to ease in forming uniform pores. The approximately spherical particles include particles having an aspect ratio (longer diameter of particle/shorter diameter of particle) in the range of from 1 to 1.5 . The aspect ratio of particles can be determined using an electron microscope.

The organic powder as the filler includes a powder composed of an organic material, such as a homopolymer of or a copolymer of two or more of styrene, vinyl ketone, acrylonitrile, methyl methacrylate, ethyl methacrylate, glycidyl methacrylate, glycidyl acrylate and methyl acrylate; a fluororesin, such as polytetrafluoroethylene, tetrafluoroethylene-hexafluoropropylene copolymer, tetrafluoroethylene-ethylene copolymer and polyvinylidene fluoride; a melamine resin; a urea resin; a polyolefin; and polymethacrylate. The organic powders may be used solely, or in admixture of two or more. Among the organic powders, a polytetrafluoroethylene powder is preferred in view of chemical stability.

Examples of the inorganic powder as the filler include a powder composed of an inorganic material, such as metal oxide, metal nitride, metal carbide, metal hydroxide, carbonate and sulfate. Among those, a powder composed of an inorganic material having a small conductivity can be preferably used. Specific examples thereof include a powder composed of alumina, silica, titanium dioxide, barium sulfate, or calcium carbonate. The inorganic powders may be used solely, or in admixture of two or more. Among the inorganic powders, an alumina powder is preferred in view of chemical stability. It is preferred that all of the particles constituting the filler be an alumina particle, and more preferred that all of the particles constituting the filler be an alumina particle, and a part or all thereof are an approximately spherical alumina particle. Incidentally, when the heat-resistant porous layer is formed from an inorganic powder, the above inorganic powder can be used, optionally along with a binder if required.

When the heat-resistant porous layer comprises a heat-resistant resin, the content of the filler in the heat-resistant porous layer varies depending on the specific gravity of the material of the filler. For example, in the case where all of the particles constituting the filler are alumina particles, the weight of the filler is usually from 5 to 95 parts by weight, preferably from 20 to 95 parts by weight, and more preferably from 30 to 90 parts by weight, assuming that the total weight of the heat-resistant porous layer is 100 parts by weight. These ranges can be appropriately set, depending on the specific gravity of the material of the filler.

(Porous Film)

In the porous laminated film, the porous film. preferably has fine pores, and can shutdown. In this case, the porous film comprises a thermoplastic resin. A thickness of the porous film is usually from 3 to 30 μm, preferably from 3 to 25 μm. The porous film has fine pores similarly to the heat-resistant porous layer, and the size of the pore is usually 3 μm or less, preferably 1 μm or less. A void content of the porous film is usually from 30 to 80 vol %, preferably from 40 to 70 vol %. When a temperature of nonaqueous electrolyte secondary battery exceeds a usual use temperature, the porous film can shut the fine pores due to softening of the thermoplastic resin constituting the porous film.

The thermoplastic resin contained in the porous film includes a resin that is softened at from 80 to 180° C., and a thermoplastic resin which does not dissolve in the electrolytic solution of a nonaqueous electrolyte secondary battery may be selected. Specific examples of the thermoplastic resin include a polyolefin resin, such as polyethylene and polypropylene, and a thermoplastic polyurethane resin. A mixture of two or more of these resins may be used. In order to perform a shutdown by softening at a lower temperature, the thermoplastic resin preferably comprises polyethylene. The polyethylene specifically includes a polyethylene, such as a low-density polyethylene, a high-density polyethylene and a linear polyethylene, and also includes an ultrahigh molecular-weight polyethylene having a molecular weight of one million or more. For further enhancing the piercing strength of the porous film, the thermoplastic resin preferably comprises at least an ultrahigh molecular-weight polyethylene. In view of production of the porous film, it is sometimes preferred that the thermoplastic resin comprise a wax composed of a polyolefin of low molecular-weight (weight average molecular weight of 10,000 or less).

The examples of a porous film comprising a heat-resistant material which differs from that of the above-described porous laminated film include a porous film formed from a heat-resistant resin and/or an inorganic powder, and a porous film in which a heat-resistant resin and/or an inorganic powder is dispersed in a thermoplastic resin film of polyolefin resin, thermoplastic polyurethane resin or the like. The heat-resistant resin and the inorganic powder include ones described above.

<Sodium Secondary Battery of the Present Invention/Electrolytic Solution or Solid Electrolyte>

In the electrolytic solution usable in the sodium secondary battery of the present invention, examples of the electrolyte include $NaClO_4$, $NaPF_6$, $NaAsF_6$, $NaSbF_6$, $NaBF_4$, $NaCF_3SO_3$, $NaN(SO_2CF_3)_2$, sodium salt of lower aliphatic carboxylate, and $NaAlCl_4$. A mixture of two or more thereof may be used. Among these, an electrolyte comprising, at least one selected from the group consisting of $NaPF_6$, $NaAsF_6$, $NaSbF_6$, $NaBF_4$, $NaCF_3SO_3$ and $NaN(SO_2CF_3)_2$, which comprise fluorine, is preferably used.

In the electrolytic solution usable in the sodium secondary battery of the present invention, examples of the organic solvent, which can be used, include carbonates, such as propylene carbonate, ethylene carbonate, dimethyl carbonate, diethyl carbonate, ethyl methyl carbonate, isopropyl methyl carbonate, vinylene carbonate, 4-trifluoromethyl-1, 3-dioxolan-2-one, and 1,2-di(methoxycarbonyloxy)ethane; ethers, such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters, such as methyl formate, methyl acetate, and γ-butyrolactone; nitriles, such as acetonitrile and butyronitrile; amides, such as N,N-dimethylformamide, and N,N-dimethylacetamide; carbamates, such as 3-methyl-2-oxazolidone; sulfur-containing compounds, such as sulfolane, dimethyl sulfoxide, and 1,3-propanesultone; and those obtained by introducing a fluorine substituent into the organic solvent above. Usually, two or more of the organic solvents are mixed and used.

A solid electrolyte may also be used in place of the electrolytic solution. Examples of the solid electrolyte which can be used include an organic solid electrolyte, such as polyethylene oxide-based polymer, and polymer comprising at least one or more of polyorganosiloxane chains or polyoxyalkylene chains. A so-called gel-type electrolyte holding a nonaqueous electrolyte solution in a polymer can also be used. An in organic solid electrolyte such as $Na_2S$—$SiS_2$, $Na_2S$—$GeS_2$, $NaTi_2(PO_4)_3$, $NaFe_2(PO_4)_3$, $Na_2(SO_4)_3$, $Fe_2(SO_4)_2(PO_4)$ and $Fe_2(MoO_4)_3$ may also be used. When such a solid electrolyte is used, safety can be enhanced in some cases. In the case of using a solid electrolyte in the sodium secondary battery of the present invention, the solid electrolyte sometimes works as a separator, and in this case, a separator may not be necessary.

EXAMPLES

The present invention is described in greater detail below by referring to examples, but the present invention is not limited thereto by any means. Incidentally, unless otherwise indicated, a production method of an electrode and a secondary battery for a. charge/discharge test, and a measurement method of powder X-ray diffraction are as follows.
(1) Production of Electrode (Positive Electrode)
A mixed metal oxide as a positive electrode active material, an acetylene black (produced by Denki Kagaku Kogyo Kabushiki Kaisha) as an electrically conductive material, and PVDF (PolyVinylidine DiFluoride Polyflon, produced by Kureha Corporation) as a binder were weighed so that a composition of positive electrode active material:electrically conductive material:binder may be 85:10:5 (by weight). Thereafter, the mixed metal oxide and the acetylene black were thoroughly mixed in an agate mortar, an appropriate amount of N-methyl-2-pyrrolidone (NMP, produced by Tokyo Chemical Industry Co., Ltd.) was added to the mixture, PVDF was further added thereto, and these were then uniformly mixed to form a slurry. The obtained slurry was applied on a 40 μm-thick aluminum foil as a current collector by using an applicator to a thickness of 100 μm of the slurry, and the aluminum foil having the applied slurry was placed in a drier and thoroughly dried by removing NMP to yield an electrode sheet. This electrode sheet was punched with a diameter of 1.5 cm by an electrode punch, and sufficiently fixed under pressure by a hand press to yield a positive electrode sheet.
(2) Production of Battery
The positive electrode sheet was placed in a recess of the bottom part of a coin cell (manufactured by Hohsen Corp.) by arranging the aluminum foil to face downward, and combined with a 1 M $NaClO_4$/propylene carbonate as an electrolyte, a polypropylene porous film (thickness: 20 μm) as a separator, and a sodium metal (produced by Aldrich Chemical Company, Inc.) as a negative electrode to produce a battery. Assembling of the battery was performed in a glove box under an argon atmosphere.
(3) Powder X-Ray Diffraction Measurement
The measurement was performed under the following conditions by using a powder X-ray diffraction measuring apparatus, Model RINT2500TTR, manufactured by Rigaku Corporation.
X-ray: CuKα
Voltage-current: 40 kV-140 mA
Measuring angle range: 2θ=10-60°
Step: 0.02°
Scan speed: 4°/min Comparative Example 1

(Na:Mn:Co=0.7:0.50:0.50)

(1) Production of Mixed Metal Oxide
Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%) and tricobalt tetraoxide ($Co_3O_4$, produced by Seido Chemical Industry Co., Ltd. purity: 99%), as metal-containing compounds, were weighed to obtain an Na:Mn:Co molar ratio of 0.7:0.50:0.50, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide C1 of Comparative Example 1. FIG. 1 shows the powder X-ray diffraction pattern of Mixed Metal Oxide C1 of Comparative Example 1.
(2) Evaluation of Charge/Discharge Performance as Positive Electrode Active Material of Sodium Secondary Battery
A battery was produced by using Mixed Metal Oxide C1 of Comparative Example 1 as the positive electrode active material for sodium secondary batteries, and subjected to a constant current charge/discharge test under the following conditions.
Charge/Discharge Conditions:
The charge was performed by CC (constant current) charge at a 0.1 C rate (a rate that requires 10 hours for full charge) up to 4.0 V. The discharge was performed by CC discharge at the same rate as the charge rate, and the current was cut off at a voltage of 1.5 V. Charge/discharge for the next and subsequent cycles was performed at the same rate as the charge rate above, and the current was cut off at a charge voltage of 4.0 V and a discharge voltage of 1.5 V similarly to the 1st cycle.
Charge/discharge of this battery was repeated 10 cycles, and the discharge capacity maintenance rate for 10th cycle was 76% based on the discharge capacity for 1st cycle.

Example 1

(Na:Mn:Co:Ni=0.7:0.495:0.495:0.01; in Formula (1), $M^1$ is Mn, Co and Ni, a is 0.7, and b is 0.495)

Figure 2:
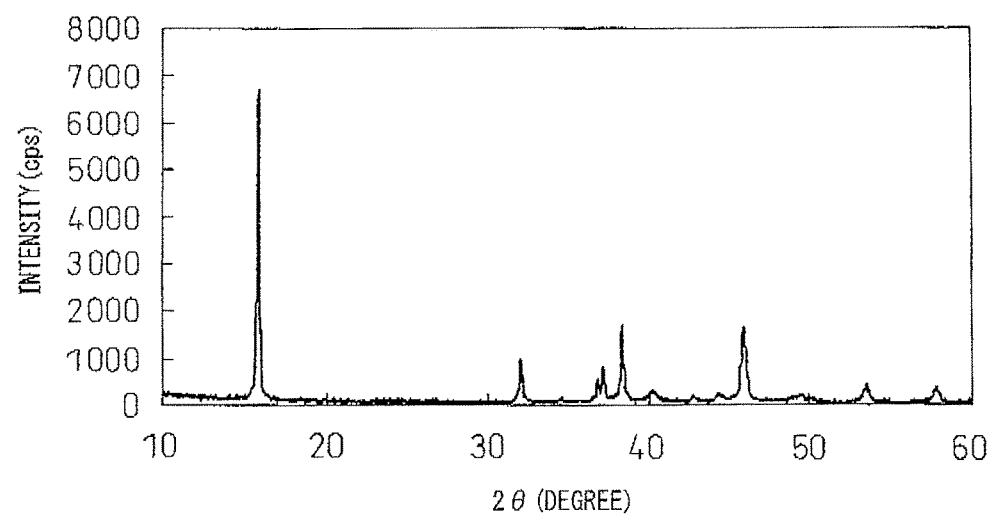
FIG. 2 A powder X-ray diffraction pattern of Mixed Metal Oxide E1.

(1) Production of Mixed Metal Oxide
Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), tricobalt tetraoxide ($Co_3O_4$, produced by Seido Chemical Industry Co., Ltd. purity: 99%) and nickel(II) oxide (NiO, produced by Kojundo Chemical Laboratory Co., Ltd., purity: 99%), as metal-containing compounds, were weighed to obtain an Na:Mn:Co:Ni molar ratio of 0.7:0.495:0.495:0.01, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E1 of Example 1. FIG. 2 shows the powder X-ray diffraction pattern of Mixed Metal Oxide E1 of Example 1.
(2) Evaluation of Charge/Discharge Performance as Positive Electrode Active Material of Sodium Secondary Battery
A battery was produced by using Mixed Metal Oxide E1 of Example 1 as the positive electrode active material for sodium secondary batteries, and subjected to a constant current charge/discharge test under the same conditions as in Comparative Example 1. Charge/discharge of this battery was repeated 10 cycles, and the discharge capacity maintenance rate for 10th cycle was 109% based on the discharge capacity for 1st cycle.

Example 2

(Na:Mn:Co:Ni=0.7:0.45:0.45:0.10; in Formula (1), $M^1$ is Mn, Co and Ni, a is 0.7, and b is 0.45)

(1) Production of Mixed Metal Oxide

Figure 3:
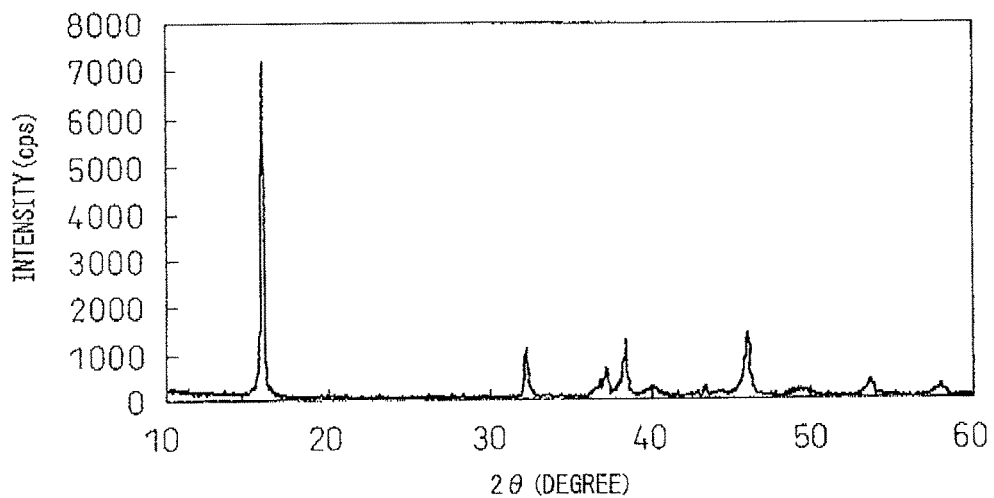
FIG. 3 A powder X-ray diffraction pattern of Mixed Metal Oxide E2.

Mixed Metal Oxide E2 of Example 2 was obtained in the same manner as in Example 1 except for using the metal-containing compounds in amounts of obtaining an Na:Mn:Co:Ni molar ratio of 0.7:0.45:0.45:0.10 . FIG. 3 shows the powder X-ray diffraction pattern of Mixed Metal Oxide E2 of Example 2.

(2) Evaluation of Charge/Discharge Performance as Positive Electrode Active Material of Sodium Secondary Battery A battery was produced by using Mixed Metal Oxide E2 of Example 2 as the positive electrode active material for sodium secondary batteries, and subjected to a constant current charge/discharge test under the same conditions as in Comparative Example 1. Charge/discharge of this battery was repeated 10 cycles, and the discharge capacity maintenance rate for 10th cycle was 89% based on the discharge capacity for 1st cycle.

Example 3

(Na:Mn:Co:Ni=0.7:0.333:0.333:0.333; in Formula (1), $M^1$ is Mn, Co and Ni, a is 0.7, and b is 0.333)

(1) Production of Mixed Metal Oxide

Figure 4:
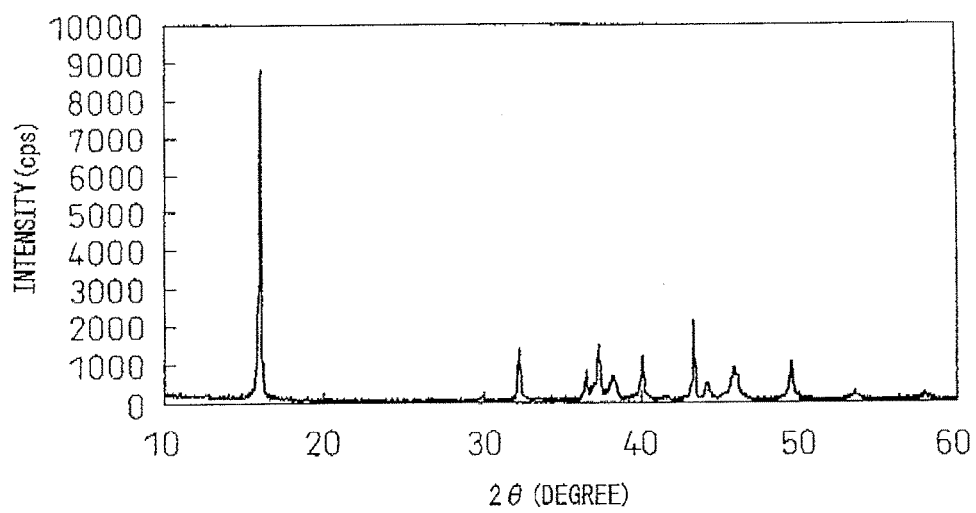
FIG. 4 A powder X-ray diffraction pattern of Mixed Metal Oxide E3.

Mixed Metal Oxide E3 of Example 3 was obtained in the same manner as in Example 1 except for using the metal-containing compounds in amounts of obtaining an Na:Mn:Co:Ni molar ratio of 0.7:0.333:0.333:0.333 . FIG. 4 shows the powder x-ray diffraction pattern of Mixed Metal Oxide E3 of Example 3.

(2) Evaluation of Charge/Discharge Performance as Positive Electrode Active Material of Sodium Secondary Battery A battery was produced by using Mixed Metal Oxide E3 of Example 3 as the positive electrode active material for sodium secondary batteries, and subjected to a constant current charge/discharge test under the same conditions as in Comparative Example 1. Charge/discharge of this battery was repeated 10 cycles, and the discharge capacity maintenance rate for 10th cycle was 90% based on the discharge capacity for 1st cycle.

Example 4

(Na:Mn:Fe:Ni=0.7:0.333:0.333:0.333; in Formula (1), $M^1$ is Mn, Fe and Ni, a is 0.7, and b is 0.333)

(1) Production of Mixed Metal Oxide

Figure 5:
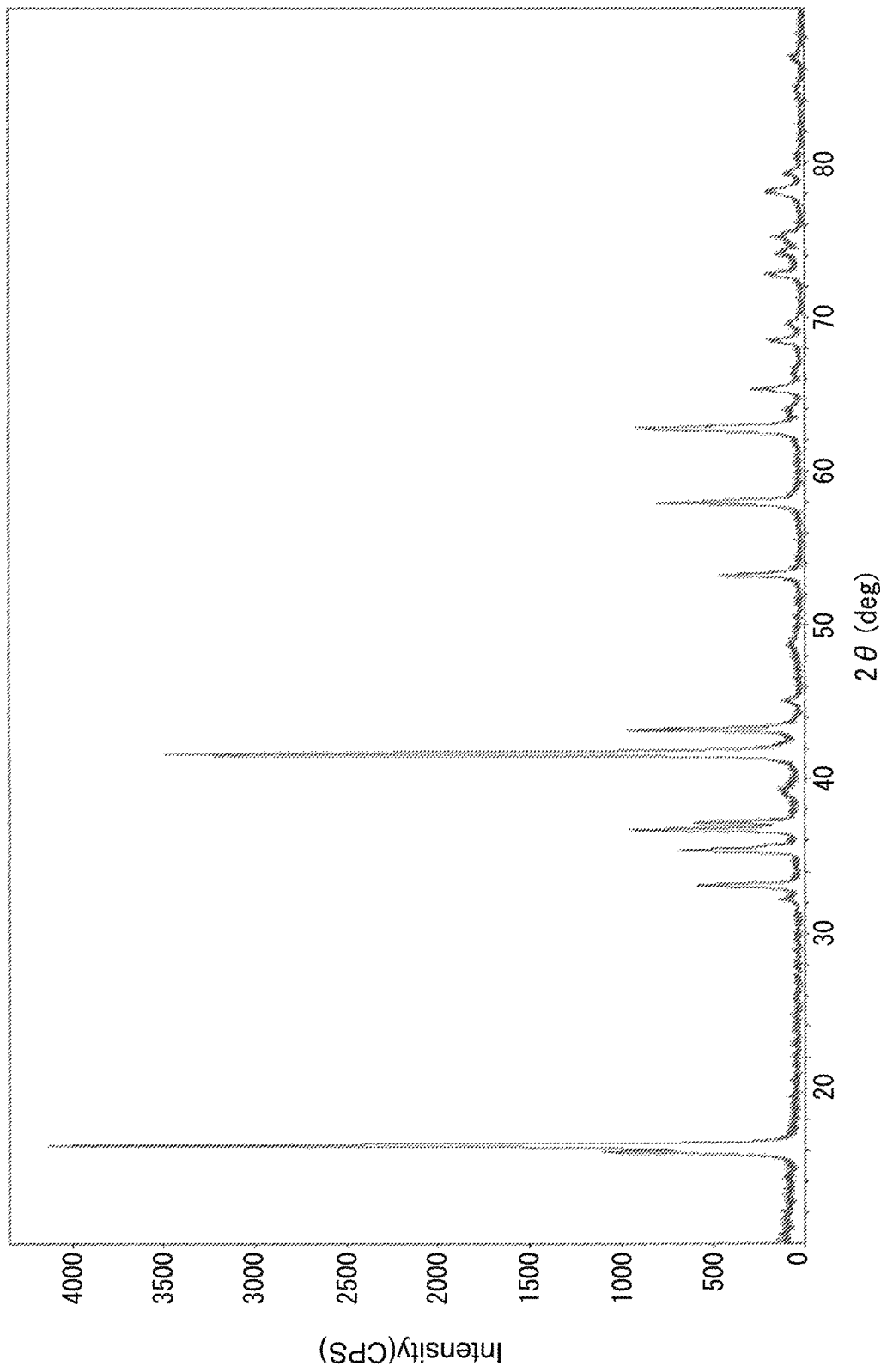
FIG. 5 A powder X-ray diffraction pattern of Mixed Metal Oxide E4.

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%) and nickel(II) oxide (NiO, produced by Kojundo Chemical Laboratory Co., Ltd., purity: 99%), as metal-containing compounds, were weighed to obtain an Na:Mn:Fe:Ni molar ratio of 0.7:0.333:0.333:0.333, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E4 of Example 4. FIG. 5 shows the powder X-ray diffraction pattern of Mixed Metal Oxide E4 of Example 4.

(2) Evaluation of Charge/Discharge Performance as Positive Electrode Active Material of Sodium Secondary Battery A battery was produced by using Mixed Metal Oxide E4 of Example 4 as the positive electrode active material for sodium secondary batteries, and subjected to a constant current charge/discharge test under the same conditions as in Comparative Example 1. Charge/discharge of this battery was repeated 10 cycles, and the discharge capacity maintenance rate for 10th cycle was 83% based on the discharge capacity for 1st cycle.

Example 5

(Na:Mn:Fe:Co=0.7:0.333:0.333:0.333; in Formula (1), $M^1$ is Mn, Fe and Co, a is 0.7, and b is 0.333)

(1) Production of Mixed Metal Oxide

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%) and tricobalt tetroxide ($Co_3O_4$, produced by Seido Chemical Industry Co., Ltd. purity: 99%), as metal-containing compounds, were weighed to obtain an Na:Mn:Fe:Co molar ratio of 0.7:0.333:0.333:0.333, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E5 of Example 5.

(2) Evaluation of Charge/Discharge Performance as Positive Electrode Active Material of Sodium Secondary Battery A battery was produced by using Mixed Metal Oxide E5 of Example 5 as the positive electrode active material for sodium secondary batteries, and subjected to a constant current charge/discharge test under the same conditions as in Comparative Example 1 . Charge/discharge of this battery was repeated 10 cycles, and the discharge capacity maintenance rate for 10th cycle was 78% based on the discharge capacity for 1st cycle.

Example 6

(Na:Mn:Fe:Co:Ni=0.7:0.25:0.25:0.25:0.25; in Formula (1), $M^1$ is Mn, Fe, Co and Ni, a is 0.7, and b is 0.25)

(1) Production of Mixed Metal Oxide

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%), tricobalt tetroxide ($Co_3O_4$, produced by Seido Chemical Industry Co., Ltd. purity: 99%) and nickel(II) oxide (NiO, produced by Kojundo Chemical Laboratory Co., Ltd., purity: 99%), as metal-containing compounds, were weighed to obtain an Na:Mn:Fe:Co:Ni molar ratio of 0.7:

0.25:0.25:0.25:0.25, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E6 of Example 6.

(2) Evaluation of Charge/Discharge Performance as Positive Electrode Active Material of Sodium Secondary Battery A battery was produced by using Mixed Metal Oxide E6 of Example 6 as the positive electrode active material for sodium secondary batteries, and subjected to a constant current charge/discharge test under the same conditions as in Comparative Example 1 . Charge/discharge of this battery was repeated 10 cycles, and the discharge capacity maintenance rate for 10th cycle was 88% based on the discharge capacity for 1st cycle.

Example 7

(Na:Mn:Fe:Ni=0.8:0.333:0.333:0.333; in Formula (1), $M^1$ is Mn, Fe and Ni, a is 0.8, and b is 0.333)

(1) Production of Mixed Metal Oxide

Figure 6:
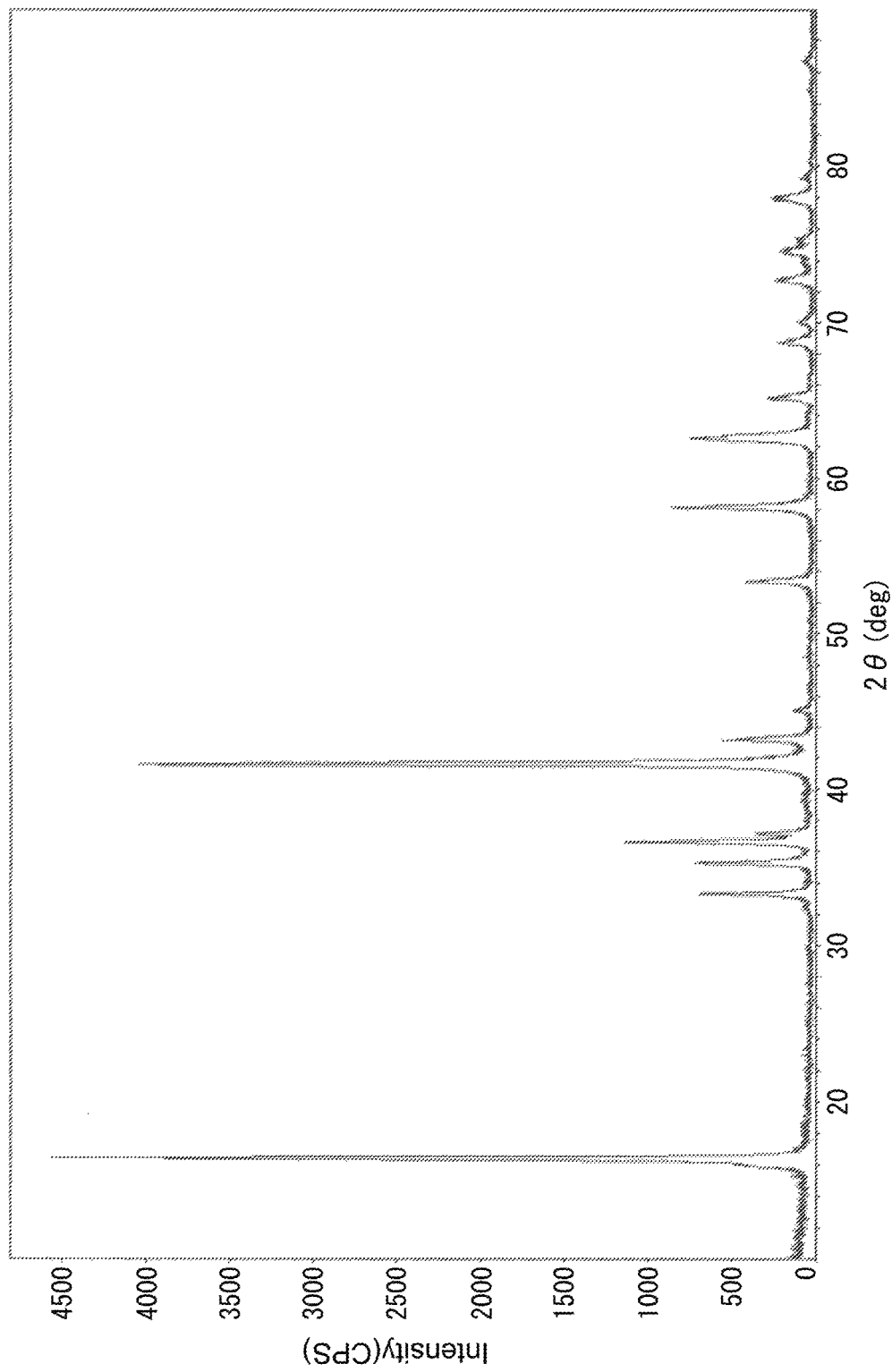
FIG. 6 A powder X-ray diffraction pattern of Mixed Metal Oxide E7.

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%) and nickel(II) oxide (NiO, produced by Kojundo Chemical Laboratory Co., Ltd., purity: 99%), as metal-containing compounds, were weighed to obtain an Na:Mn:Fe:Ni molar ratio of 0.8:0.333:0.333:0.333, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E7 of Example 7. FIG. 6 shows the powder X-ray diffraction pattern of Mixed Metal Oxide E7 of Example 7.

(2) Evaluation of Charge/Discharge Performance as Positive Electrode Active Material of Sodium Secondary Battery A battery was produced by using Mixed Metal Oxide E7 of Example 7 as the positive electrode active material for sodium secondary batteries, and subjected to a constant current charge/discharge test under the same conditions as in Comparative Example 1 . Charge/discharge of this battery was repeated 10 cycles, and the discharge capacity maintenance rate for 10th cycle was 93% based on the discharge capacity for 1st cycle.

Example 8

(Na:Mn:Fe:Ni=0.9:0.333:0.333:0.333; in Formula (1), $M^1$ is Mn, Fe and Ni, a is 0.9, and b is 0.333)

(1) Production of Mixed Metal Oxide

Figure 7:
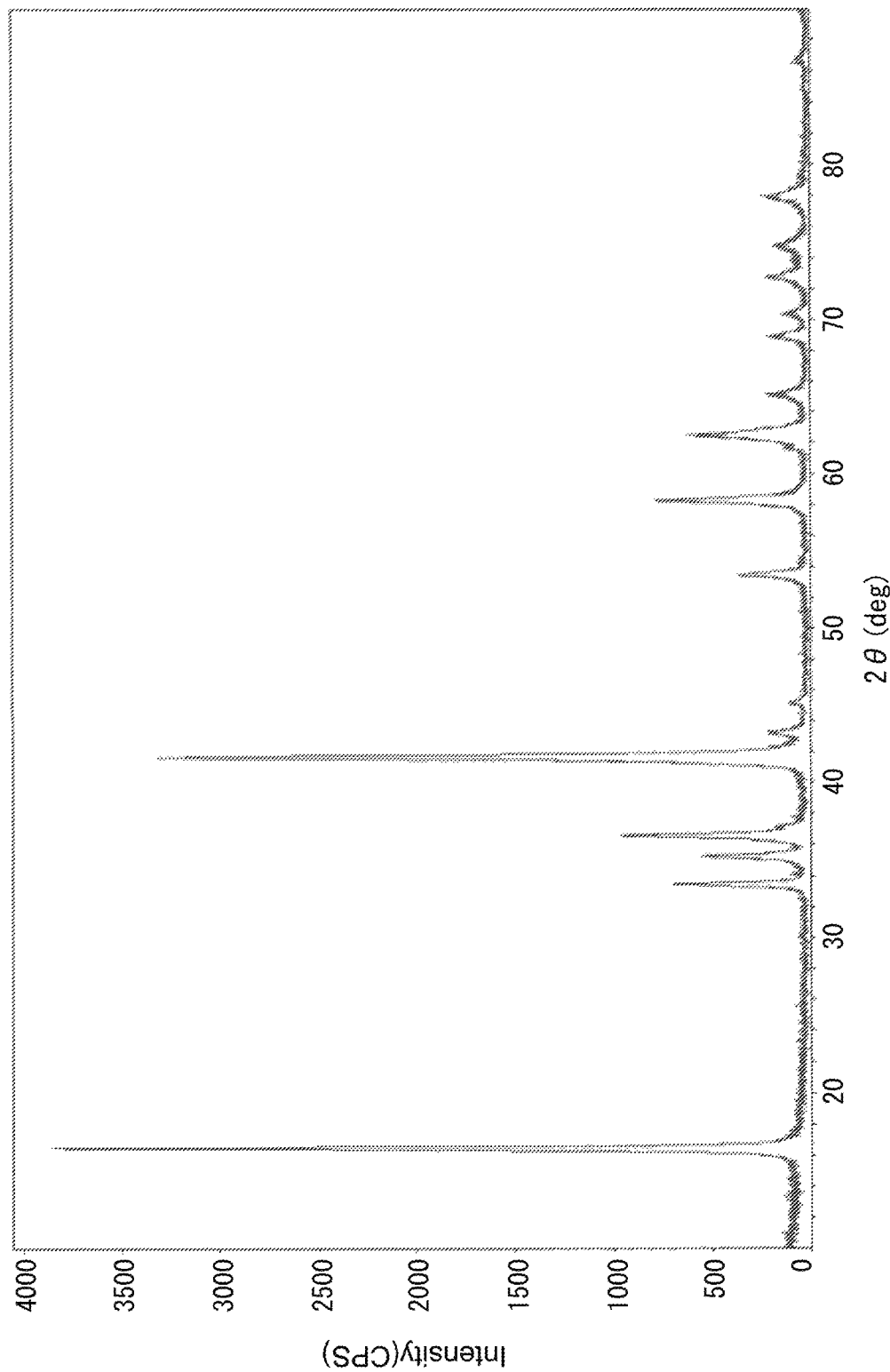
FIG. 7 A powder X-ray diffraction pattern of Mixed Metal Oxide E8.

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%) and nickel(II) oxide (NiO, produced by Kojundo Chemical Laboratory Co., Ltd., purity: 99%), as metal-containing compounds, were weighed to obtain an Na:Mn:Fe:Ni molar ratio of 0.9:0.333:0.333:0.333, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E8 of Example 8. FIG. 7 shows the powder X-ray diffraction pattern of the Mixed Metal Oxice E8 of Example 8.

(2) Evaluation of Charge/Discharge Performance as Positive Electrode Active Material of Sodium Secondary Battery A battery was produced by using Mixed Metal Oxide E8 of Example 8 as the positive electrode active material for sodium secondary batteries, and subjected to a constant current charge/discharge test under the same conditions as in Comparative Example 1 . Charge/discharge of this battery was repeated 10 cycles, and the discharge capacity maintenance rate for 10th cycle was 88% based on the discharge capacity for 1st cycle.

Example 9

(Na:Mn:Fe:Ni=0.7:0.38:0.38:0.24; in Formula (1), $M^1$ is Mn, Fe and Ni, a is 0.7, and b is 0.38)

(1) Production of Mixed Metal Oxide

Figure 8:
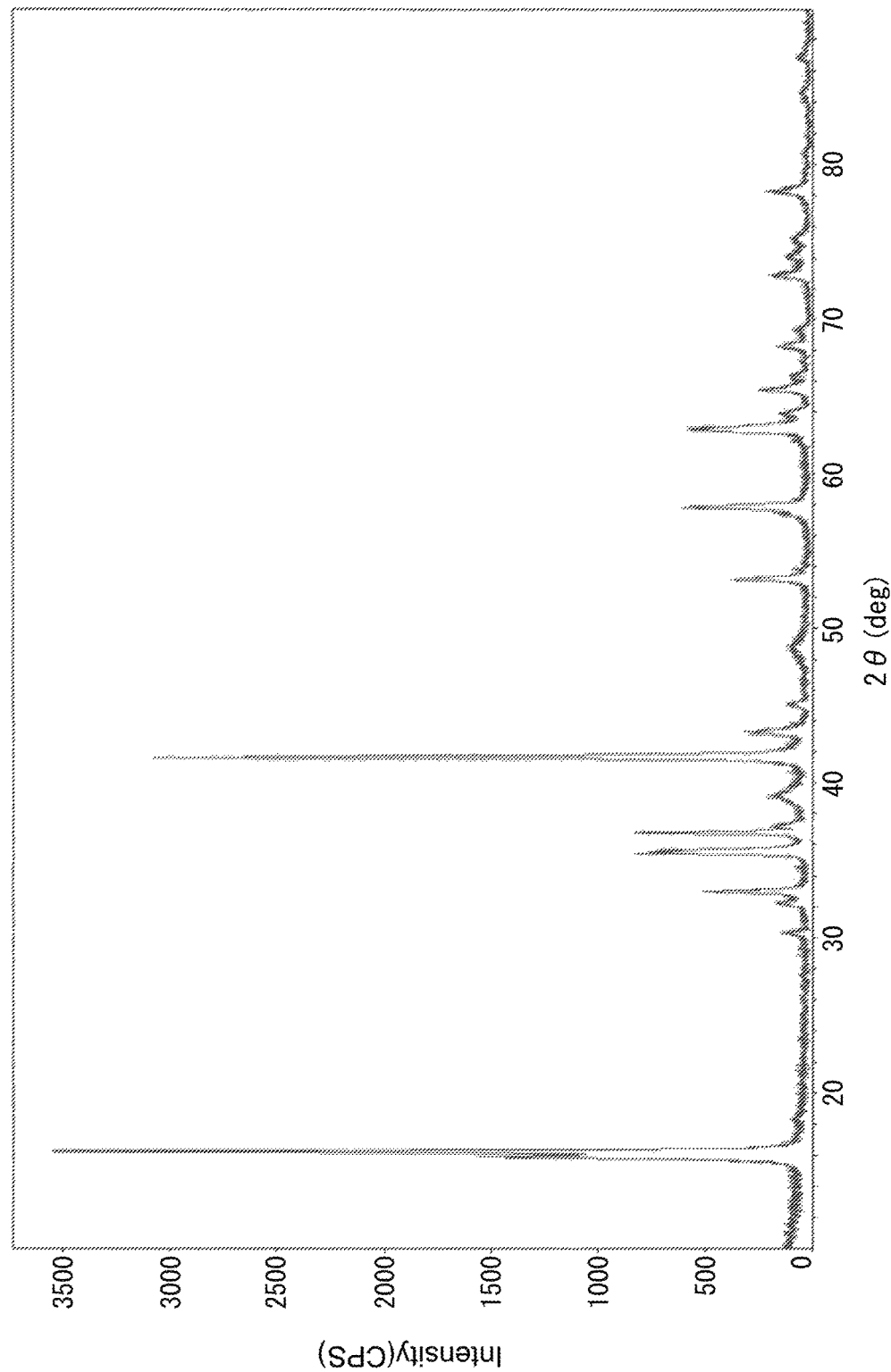
FIG. 8 A powder X-ray diffraction pattern of Mixed Metal Oxide E9.

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%) and nickel(II) oxide (NiO, produced by Kojundo Chemical Laboratory Co., Ltd., purity: 99%), as metal-containing compounds, were weighed to obtain an Na:Mn:Fe:Ni molar ratio of 0.7:0.38:0.38:0.24, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E9 of Example 9. FIG. 8 shows the powder X-ray diffraction pattern of Mixed Metal Oxide E9 of Example 9.

(2) Evaluation of Charge/Discharge Performance as Positive Electrode Active Material of Sodium Secondary Battery A battery was produced by using Mixed Metal Oxide E9 of Example 9 as the positive electrode active material for sodium secondary batteries, and subjected to a constant current charge/discharge test under the same conditions as in. Comparative Example 1. Charge/discharge of this battery was repeated 10 cycles, and the discharge capacity maintenance rate for 10th cycle was 93% based on the discharge capacity for 1st cycle.

Example 10

(Na:Mn:Fe:Ni=0.7:0.42:0.42:0.16; in Formula (1), $M^1$ is Mn, Fe and Ni, a is 0.7, and b is 0.42)

(1) Production of Mixed Metal Oxide

Figure 9:
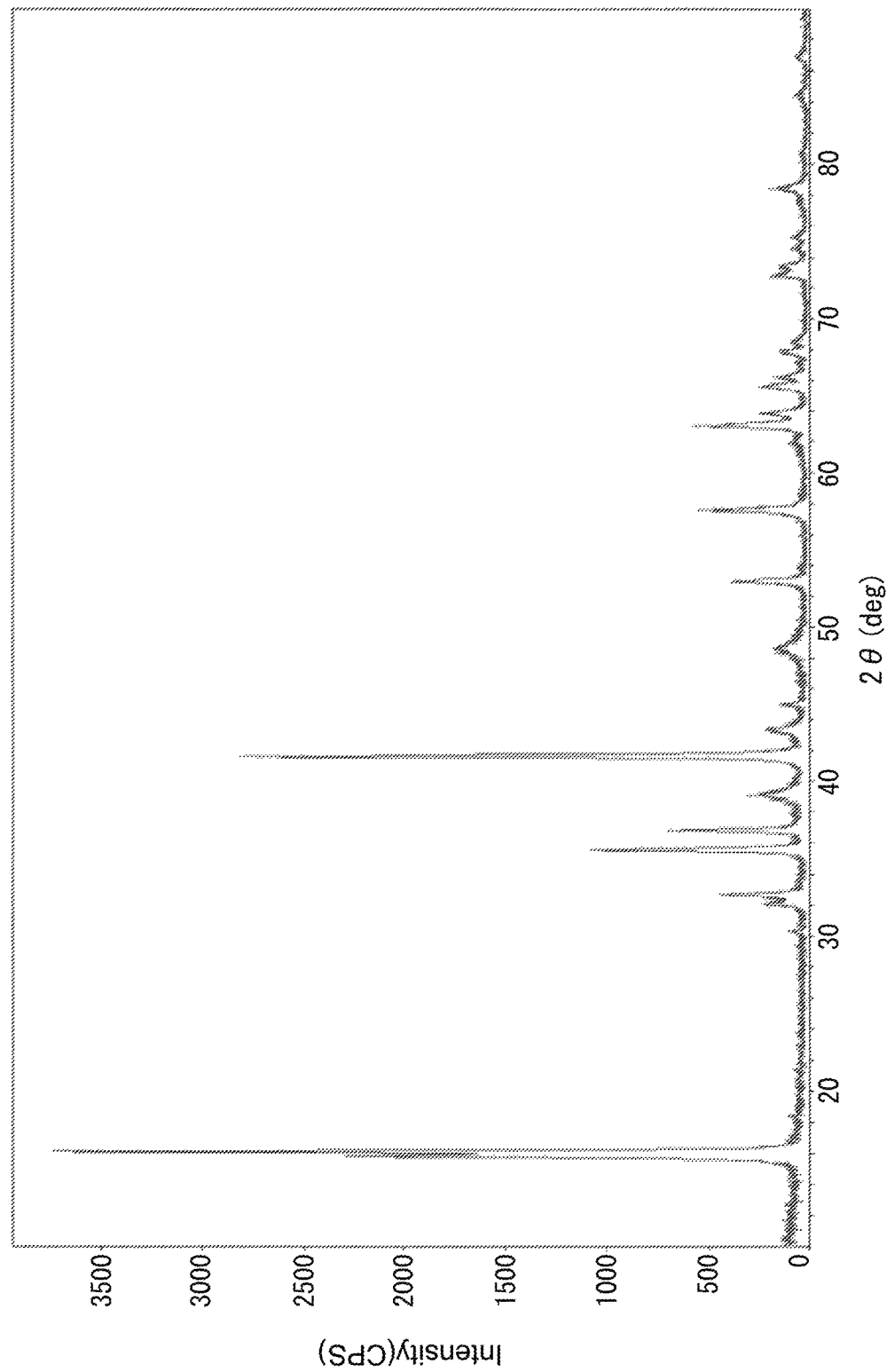
FIG. 9 A powder X-ray diffraction pattern of Mixed Metal Oxide E10.

Sodium carbonate ($Na_2CO_3$, produced by Wako Pure Chemical Industries, Ltd., purity: 99.8%), manganese (IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co, Ltd., purity: 99%) and nickel(II) oxide (NiO, produced by Kojundo Chemical Laboratory Co., Ltd., purity: 99%), as metal-containing compounds, were weighed to obtain an Na:Mn:Fe:Ni molar ratio of 0.7:0.42:0.42:0.16, and mixed in a dry ball mill over 4 hours to obtain a mixture of the metal-containing ompounds. The obtained mixture of the metal-containing compounds was filled in an alumina boat, heated in an air atmosphere by using an electric furnace, and kept at 800° C. over 2 hours to obtain Mixed Metal Oxide E10 of Example 10. FIG. 9 shows the powder X-ray diffractionpattern of Mixed Metal Oxide E10 of Example 10.

(2) Evaluation of Charge/Discharge Performance as Positive Electrode Active Material of Sodium Secondary Battery A battery was produced by using Mixed Metal Oxide E10 of Example 10 as the positive electrode active material for sodium secondary batteries, and subjected to a constant current charge/discharge test under the same conditions as in Comparative Example 1. Charge/discharge of this battery was repeated 10 cycles, and the discharge capacity maintenance rate for 10th cycle was 84% based on the discharge capacity for 1st cycle.

Example 11

(Na:Mn:Fe:Ni=0.7:0.46:0.46:0.08; in Formula (1), $M^1$ is Mn, Fe and Ni, a is 0.7, and b is 0.46)

(1) Production of Mixed Metal Oxide

Figure 10:
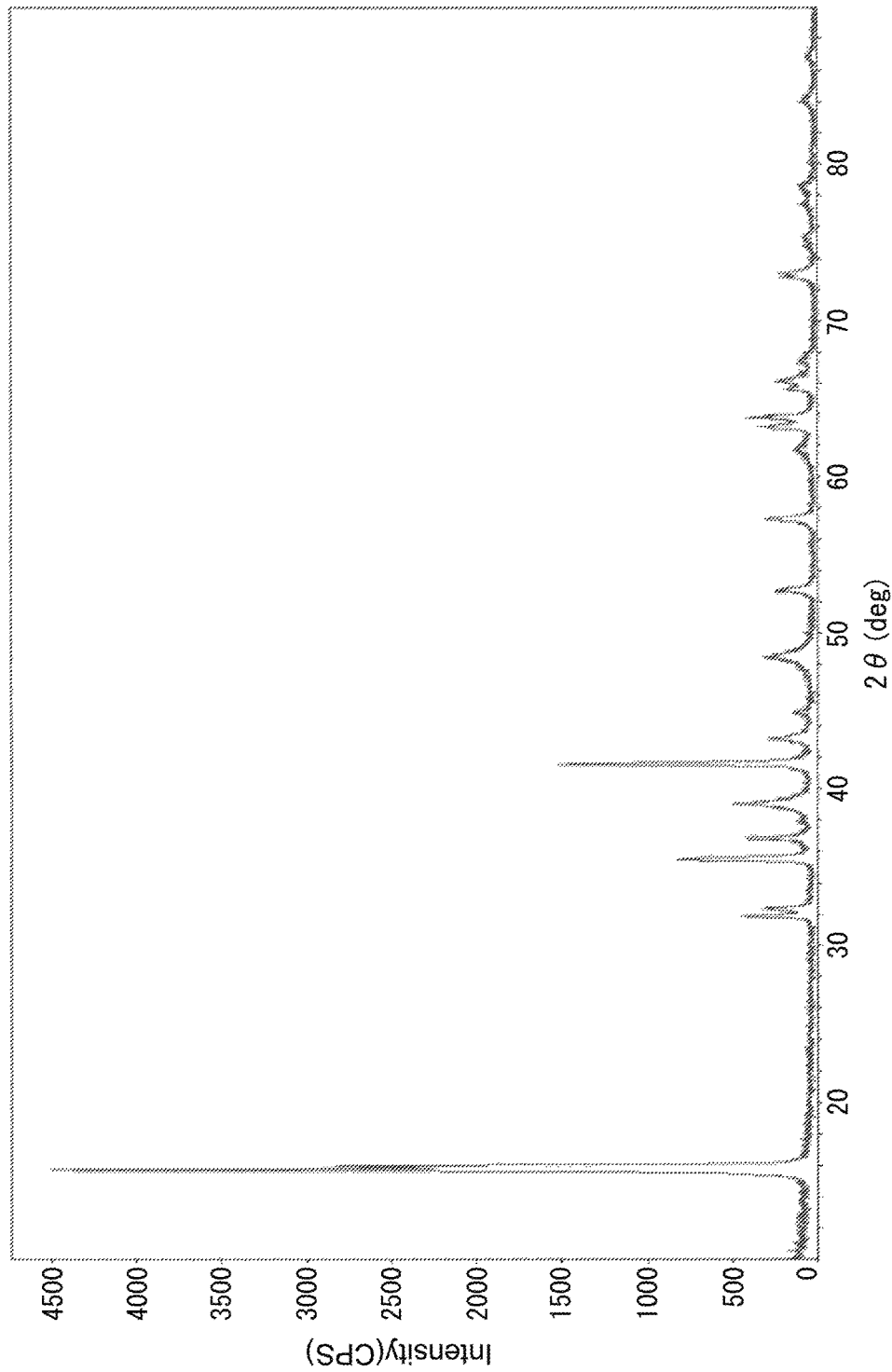
FIG. 10 A powder X-ray diffraction pattern of Mixed Metal Oxide E11.

Sodium carbonate ($Na_2CO_3$, produced by Wako Pure Chemical Industries, Ltd., purity: 99.8%), manganese(IV) oxide ($MnO_2$, produced by Kojundo Chemical Laboratory Co., Ltd., purity: 99.9%), iron(II, III) oxide ($Fe_3O_4$, produced by Kojundo Chemical Laboratory Co., Ltd., purity: 99%) and nickel(II) oxide (NiO, produced by Kojundo Chemical Laboratory Co., Ltd., purity: 99%), as metal-containing compounds, were weighed to obtain an Na:Mn:Fe:Ni molar ratio of 0.7:0.46:0.46:0.08, and mixed in a dry ball mill over 4 hours to obtain a mixture of the metal-containing compounds. The obtained mixture of the metal-containing compounds was filled in an alumina boat, heated in an air atmosphere by using an electric furnace, and kept at 800° C. over 2 hours to obtain Mixed Metal Oxide E11 of Example 11. FIG. 10 shows the powder X-ray diffraction pattern of Mixed Metal Oxide E11 of Example 11.

(2) Evaluation of Charge/Discharge Performance as Positive Electrode Active Material of Sodium Secondary Battery A battery was produced by using Mixed Metal Oxide E11 of Example 11 as the positive electrode active material for sodium secondary batteries, and subjected to a constant current charge/discharge test under the same conditions as in Comparative Example 1. Charge/discharge of this battery was repeated 10 cycles, and the discharge capacity maintenance rate for 10th cycle was 90% based on the discharge capacity for 1st cycle.

Production Example 1

(Production of Porous Laminated Film)

(1) Production of Slurry of Applying Heat-Resistant Porous Layer

After dissolving 272.7 g of calcium chloride in 4,200 g of NMP, 132.9 g of para-phenylenediamine was added and completely dissolved therein. To the obtained solution, 243.3 g of terephthalic acid dichloride was gradually added to effect the polymerization, and thereby obtain a para-aramide. The obtained solution was further diluted with NMP to obtain a para-aramide solution having a concentration of 2.0 wt %. To 100 g of the obtained para-aramide solution, 2 g of a first alumina powder (Alumina C, produced by Nippon Aerosil Co., Ltd., average particle diameter: 0.02 μm) and 2 g of a second alumina powder (Sumicorundum AA03, produced by Sumitomo Chemical Co., Ltd., average particle diameter: 0.3 μm), as a filler in total of 4 g, were added and mixed. The resulting mixture was subjected to a nanomizer three times, filtered with a 1,000-mesh metal screen, and defoamed under reduced pressure to produce a slurry of applying for heat-resistant porous layer. The amount of the alumina powder (filler) was 67 wt %, based on the total weight of the para-aramide and alumina powder.

(2) Production of Porous Laminated Film

As for a porous film, a polyethylene porous film (film thickness of 12 μm, air permeability of 140 seconds/100 ml, average pore diameter of 0.1 μm, void content of 50%) was used. The polyethylene porous film above was fixed on a 100 μm-thick PET film, and the slurry of applying for heat-resistant porous layer was applied on the porous film by a bar coater manufactured by Tester Sangyo Co., Ltd. The coated porous film on the PET film was, while maintaining the integrity, dipped in water, which is a poor solvent, to precipitate a para-aramide porous film (heat-resistant porous layer). After that, the solvent was dried and the PET film was removed to yield a porous laminated film in which a heat-resistant porous layer and a porous film were stacked each other. The thickness of the porous laminate film was 16 μm, and the thickness of the para-aramide porous layer (heat-resistant porous layer) was 4 μm. The air permeability of the porous laminate film was 180 seconds/100 ml, and the void content was 50%. The cross-section of the heat-resistant porous layer in the porous laminated film was observed by a scanning electron microscope (SEM), as a result, the heat-resistant porous layer was found to have relatively small pores of approximately 0.03 μm to 0.06 μm and relatively large pores of approximately 0.1 μm to 1 μm. Evaluations of the porous laminated film were performed as in the following (A) to (C).

(A) Thickness Measurement

The thicknesses of the porous laminated film and the porous film were measured in accordance with JIS standards (K7130-1992). The thickness of the heat-resistant porous layer was determined by subtracting the thickness of the porous film from the thickness of the porous laminated film.

(B) Measurement of Air Permeability by Gurley Method

The air permeability of the porous laminated film was measured based on JIS P8117 by a digital-timer type Gurley densometer manufactured by Yasuda Seiki Seisakusho, Ltd.

(C) Void Content

The obtained porous laminated film sample was cut into a square shape which is 10 cm on each side, and the weight W (g) and the thickness D (cm) were measured. The weight (Wi (g)) of each layer in the sample was determined, the volume of each layer was determined from Wi and the true specific gravity (true specific gravity i (g/cm³)) of each layer, and the void content (vol %) was determined according to the following formula:

Void content (vol %)=100×{1−(W1/true specific gravity 1+W2/true specific gravity 2+ . . . +Wn/true specific gravity n)/(10×10×D)}

When the porous laminated film obtained by Production Example is used as a separator in the sodium secondary batteries of the above Examples, the sodium secondary batteries can more successfully prevent thermal film rupture.

The invention claimed is:
1. A mixed metal oxide represented by the following formula (1):

$$Na_aM^1O_2 \qquad (1)$$

wherein $M^1$ represents Mn, Fe and Ni, and a is a value falling within the range of from 0.7 to 0.9, and wherein a $M^1$:Mn molar ratio is 1:b, and b is a value not less than 0.333 and 0.46 or less, wherein a compositional ratio by mol of Mn:Fe:Ni is 1:x:y, wherein x is 1 and y is 0.17 to 1.

2. A positive electrode active material for sodium secondary batteries which comprises the mixed metal oxide according to claim 1.

3. A positive electrode for sodium secondary batteries which comprises the positive electrode active material according to claim 2.

4. A sodium secondary battery having the positive electrode according to claim 3.

5. The sodium secondary battery according to claim 4 further having a separator.

6. The sodium secondary battery according to claim 5, wherein the separator is a separator having a porous laminated film in which a heat-resistant porous layer comprising a heat-resistant resin and porous film comprising a thermoplastic resin are stacked to each other.

* * * * *